(12) United States Patent
Ishino et al.

(10) Patent No.: US 11,328,242 B2
(45) Date of Patent: May 10, 2022

(54) OPERATION CONTROL APPARATUS, OPERATION CONTROL METHOD, AND OPERATION CONTROL PROGRAM FOR DISPLAYING A SELECTED KPI IN A TIME-SERIES MANNER ON THE SAME SCREEN THAT THE RESPONSIBLE DEPARTMENT IS DISPLAYED

(71) Applicant: Hitachi Industry & Control Solutions, Ltd., Hitachi (JP)

(72) Inventors: Tomoko Ishino, Ibaraki (JP); Yasuhiro Takahashi, Ibaraki (JP); Nobuyuki Sonoda, Ibaraki (JP)

(73) Assignee: HITACHI INDUSTRY & CONTROL SOLUTIONS, LTD., Hitachi (JP)

( * ) Notice: Subject to any disclaimer, the term of this patent is extended or adjusted under 35 U.S.C. 154(b) by 0 days.

(21) Appl. No.: 17/030,680

(22) Filed: Sep. 24, 2020

(65) Prior Publication Data

US 2021/0089991 A1    Mar. 25, 2021

(30) Foreign Application Priority Data

Sep. 24, 2019    (JP) .............................. JP2019-172737

(51) Int. Cl.
*G06Q 10/06*    (2012.01)
(52) U.S. Cl.
CPC ... *G06Q 10/06393* (2013.01); *G06Q 10/0633* (2013.01)
(58) Field of Classification Search
None
See application file for complete search history.

(56) References Cited

U.S. PATENT DOCUMENTS

| 2005/0071737 A1* | 3/2005 | Adendorff | ............. G06F 16/283 |
| | | | 715/276 |
| 2005/0216831 A1* | 9/2005 | Guzik | .................... G06Q 40/00 |
| | | | 715/255 |
| 2006/0010164 A1 | 1/2006 | Netz et al. | |

(Continued)

FOREIGN PATENT DOCUMENTS

| DK | 201970303 A1 | 5/2019 |
| JP | 2006-331311 A | 12/2006 |

(Continued)

OTHER PUBLICATIONS

Extended European Search Report received in corresponding European Application No. 20198093.5 dated Nov. 13, 2020.

(Continued)

*Primary Examiner* — Sujay Koneru
(74) *Attorney, Agent, or Firm* — Mattingly & Malur, PC

(57) ABSTRACT

An operation control apparatus of the invention includes a KPI tree preparation field for accepting an issues-structure tree indicating a causal relation of an issue of an organization having a plurality of departments, and KPI definition information having a KPI for evaluating the issue mutually associated with the department responsible for the KPI, and a KPI tree generation field for generating a KPI tree indicating the causal relation of the KPI from the issues-structure tree indicating the causal relation of the issue by accepting a user's association of the KPI with the issue constituting the issues-structure tree.

4 Claims, 11 Drawing Sheets

(56) References Cited

U.S. PATENT DOCUMENTS

| | | | | |
|---|---|---|---|---|
| 2007/0265863 | A1* | 11/2007 | Tien | G06Q 30/00 |
| | | | | 715/825 |
| 2009/0076867 | A1* | 3/2009 | Eryaman | G06Q 10/063 |
| | | | | 705/7.39 |
| 2010/0332439 | A1* | 12/2010 | Adachi | G06Q 30/02 |
| | | | | 706/52 |
| 2013/0317847 | A1* | 11/2013 | Yui | G06Q 10/06311 |
| | | | | 705/2 |
| 2016/0103888 | A1* | 4/2016 | Fletcher | G06F 16/2455 |
| | | | | 707/722 |
| 2016/0104076 | A1* | 4/2016 | Maheshwari | G06N 20/00 |
| | | | | 706/12 |
| 2016/0104091 | A1* | 4/2016 | Fletcher | H04L 41/5045 |
| | | | | 705/7.39 |
| 2016/0292611 | A1* | 10/2016 | Boe | H04L 41/5009 |
| 2020/0226525 | A1* | 7/2020 | Bhattacharya | G06Q 10/06393 |
| 2021/0049143 | A1* | 2/2021 | Jacinto | G06F 16/909 |

FOREIGN PATENT DOCUMENTS

| | | |
|---|---|---|
| JP | 2012-059074 A | 3/2012 |
| WO | 2018/083756 A1 | 5/2018 |

OTHER PUBLICATIONS

Japanese Office Action received in corresponding Japanese Application No. 2019-172737 dated Jul. 28, 2020.

* cited by examiner

| | 101 | 102 | 103 | 104 | 105 | 106 |
|---|---|---|---|---|---|---|
| | KPI ID | KPI | MEASUREMENT PURPOSE | DEFINITION FORMULA | RESPONSIBLE DEPARTMENT | THRESHOLD VALUE |
| | C001 | PRODUCT INVENTORY TURNOVER RATIO | TO OPTIMIZE PRODUCT INVENTORY | PRODUCT INVENTORY TURNOVER RATIO = SALES AMOUNT/ (PRODUCT INVENTORY QUANTITY x PRODUCT UNIT PRICE) x 100 | IN-HOUSE LOGISTICS MANAGEMENT DEPARTMENT | # |
| | C002 | PRODUCT STOCKOUT RATE | TO OPTIMIZE PRODUCT INVENTORY | PRODUCT STOCKOUT RATE = (1-ACTUAL SHIPMENT QUANTITY/REQUIRED SHIPMENT QUANTITY) x 100 | | # |
| | C003 | ON TIME PRODUCTION RATE | TO KEEP PRODUCING ACCORDING TO PRODUCTION PLAN | ON TIME PRODUCTION RATE = (ON TIME PRODUCTION QUANTITY/PLANNED PRODUCTION QUANTITY) x 100 | MANUFAC- TURING MANAGEMENT DEPARTMENT | # |
| | C004 | PRODUCTION DEFECTIVE RATE | TO REDUCE QUALITY ISSUE | PRODUCTION DEFECTIVE RATE = (NUMBER OF REJECTS/ PRODUCTION RESULT) x 100 | | # |
| | C005 | NUMBER OF DEFECTIVES | | NUMBER OF DEFECTIVES = NUMBER OF REJECTS | | # |
| | C006 | NUMBER OF UNEXPECTED FACILITY FAILURES | TO REDUCE UNEXPECTED FACILITY STOP | NUMBER OF UNEXPECTED FACILITY FAILURES = Σ NUMBER OF UNEXPECTED FACILITY FAILURES | MAINTENANCE MANAGEMENT DEPARTMENT | # |
| | C007 | UNEXPECTED FACILITY DOWNTIME | | UNEXPECTED FACILITY DOWNTIME = Σ UNEXPECTED FACILITY DOWNTIME | | # |
| | C008 | PARTS AND MATERIAL ON TIME RECEIVING RATE | TO IMPROVE PARTS AND MATERIAL ON TIME RECEIVING RATE AND QUALITY | PARTS AND MATERIAL ON TIME RECEIVING RATE = (NUMBER OF ON TIME PARTS AND MATERIAL RECEIVING/ NUMBER OF ORDERS) x 100 | PROCUREMENT DEPARTMENT | # |
| | C009 | PARTS AND MATERIAL DEFECTIVE RATE | | PARTS AND MATERIAL DEFECTIVE RATE = (NUMBER OF REJECT PARTS/TOTAL NUMBER OF RECEIVED PARTS) x 100 | | # |
| | ... | | | | | |

FIG. 3

| TIME PERIOD | SALES AMOUNT | PRODUCT INVENTORY QUANTITY | PRODUCT UNIT PRICE | ACTUAL SHIPMENT QUANTITY | REQUIRED SHIPMENT QUANTITY | ON TIME PRODUCTION QUANTITY | PLANNED PRODUCTION QUANTITY | NUMBER OF REJECTS | PRODUCTION RESULT | ... |
|---|---|---|---|---|---|---|---|---|---|---|
| Jan/2019 | # | # | # | # | # | # | # | # | # | |
| Feb/2019 | # | # | # | # | # | # | # | # | # | |
| Mar/2019 | # | # | # | # | # | # | # | # | # | |
| Apr/2019 | # | # | # | # | # | # | # | # | # | |
| May/2019 | # | # | # | # | # | # | # | # | # | |
| Jun/2019 | | | | | | | | | | |
| .. | | | | | | | | | | |

FIG. 4

| TIME PERIOD | KPI VALUE (KPI ID) | | | | | | | | |
|---|---|---|---|---|---|---|---|---|---|
| | C001 | C002 | C003 | C004 | C005 | C006 | C007 | C008 | C009 |
| Jan/2019 | # | # | # | # | # | # | # | # | ... |
| Feb/2019 | # | # | # | # | # | # | # | # | |
| Mar/2019 | # | # | # | # | # | # | # | # | |
| Apr/2019 | # | # | # | # | # | # | # | # | |
| May/2019 | # | # | # | # | # | # | # | # | |
| Jun/2019 | # | | | | | | | | |
| ... | | | | | | | | | |

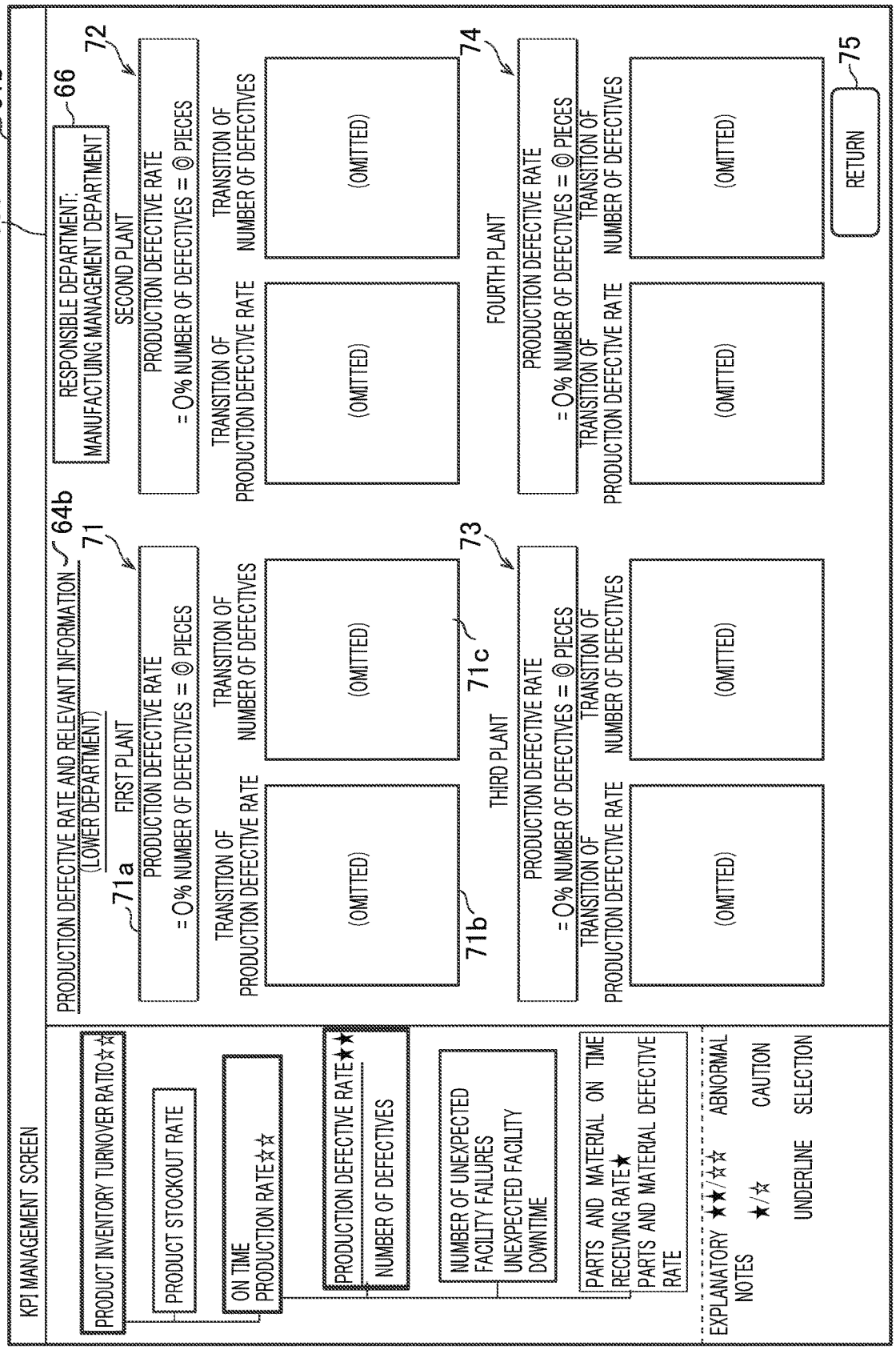

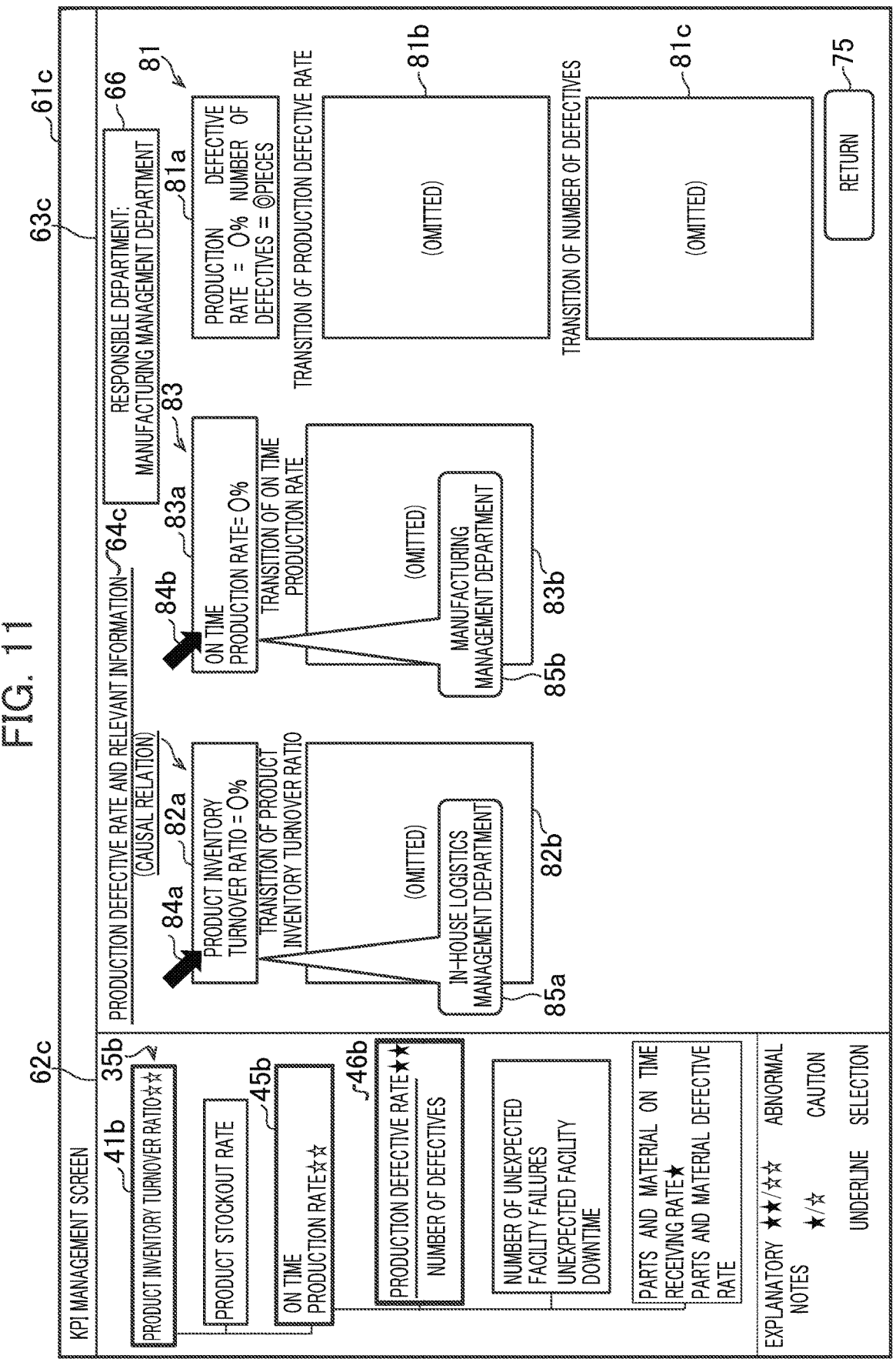

OPERATION CONTROL APPARATUS, OPERATION CONTROL METHOD, AND OPERATION CONTROL PROGRAM FOR DISPLAYING A SELECTED KPI IN A TIME-SERIES MANNER ON THE SAME SCREEN THAT THE RESPONSIBLE DEPARTMENT IS DISPLAYED

CROSS-REFERENCE TO RELATED APPLICATION

The present application claims priority from Japanese application JP 2019-172737, filed on Sep. 24, 2019, the contents of which is hereby incorporated by reference into this application.

BACKGROUND

The present invention relates to an operation control apparatus, an operation control method, and an operation control program.

In the recent manufacturing industry, as a result of market maturizaation, the product demand characteristic has been diversified to diversify manufacturing forms and management styles of the products. The business management strategy has been complicated accordingly. Companies have been making efforts to improve business operations on a daily basis by increasing the rotation cycle speed of PDCA as abbreviation of P (Plan), D (Do), C (Check), and A (Action). With the above-described background, the technology which allows the computer to visualize or simulate transition of the indicator essential for the management strategy which involves "profit" and the like has been put into practical use.

The strategic information server as disclosed in Japanese Unexamined Patent Application Publication No. 2012-59074 clarifies the correspondence between the key performance indicator (KPI) as a control target and the key goal indicator (KGI) as an end target. The strategic information server stores the KGI and KPI preliminarily associated with each other via a search key. If there are multiple KPI corresponding to the single KGI, the single KPI is obtained by narrowing down through the strategic information server using the search key.

The decision-making support system as disclosed in Japanese Unexamined Patent Application Publication No. 2006-331311 is configured to display the business plan (promise) prepared by the person in charge for the management. The decision-making support system adds such information of the business plan as sales amount, cost, and gross profit as the difference derived from subtracting the cost from the sales amount to the individual business plans. Furthermore, the decision-making support system adds such information of the business plan as the name of the business planner, and the ratio (contribution ratio) of the gross profit in the absence of the business plan to the gross profit in the presence of the business plan to the individual business plans.

SUMMARY

There is the theoretical or empirical causal relation between the KPI as the control target and the KPI as the end target. On the assumption that both the causal relation, and the department responsible for each KPI as the control target have been clarified, the specific measure for attainment of the end target may be easily taken. Actually, however, it is difficult for the corporate giant to easily satisfy the above-assumed preconditions.

In the technology disclosed in Japanese Unexamined Patent Application Publication No. 2012-59074, the single KPI may be narrowed down for attaining the predetermined KGI. However, there is no description about the operation for displaying the causal relation between the KGI and KPI, nor the department responsible for the KPI which has been narrowed down. In the technology disclosed in Japanese Unexamined Patent Application Publication No. 2006-331311, the contribution ratio which involves the gross profit is defined as the unique reference for evaluating the business plan with no consideration of such idea as the causal relation between the KPI. Although the latter patent literature describes the subordinate concepts such as the "shipment volume" and "average sales price" to the sales amount, and the "indirect cost" and "direct cost" to the cost, the department responsible for those concepts is not described.

It is an object of the present invention to clarify the causal relation between the KPI as the control target and the KPI as the end target, and the department responsible for each KPI as the control target.

The operation control apparatus according to the present invention includes a KPI tree preparation field for accepting an issues-structure tree indicating a causal relation of an issue of an organization having a plurality of departments, and KPI definition information having a KPI for evaluating the issue mutually associated with the department responsible for the KPI, and a KPI tree generation field for generating a KPI tree indicating the causal relation of the KPI from the issues-structure tree indicating the causal relation of the issue by accepting a user's association of the KPI with the issue constituting the issues-structure tree.

The present invention is capable of clarifying the causal relation between the KPI as the control target and the KPI as the end target, and the department responsible for each KPI as the control target.

BRIEF DESCRIPTION OF THE DRAWINGS

FIG. 2 is a view showing an example of KPI definition information;

FIG. 3 is a view showing an example of basic value information;

FIG. 4 is a view showing an example of KPI value information;

FIG. 10 is a view showing a display example of the KPI management screen; and

FIG. 11 is a view showing a display example of the KPI management screen.

DETAILED DESCRIPTION

Figure 1:
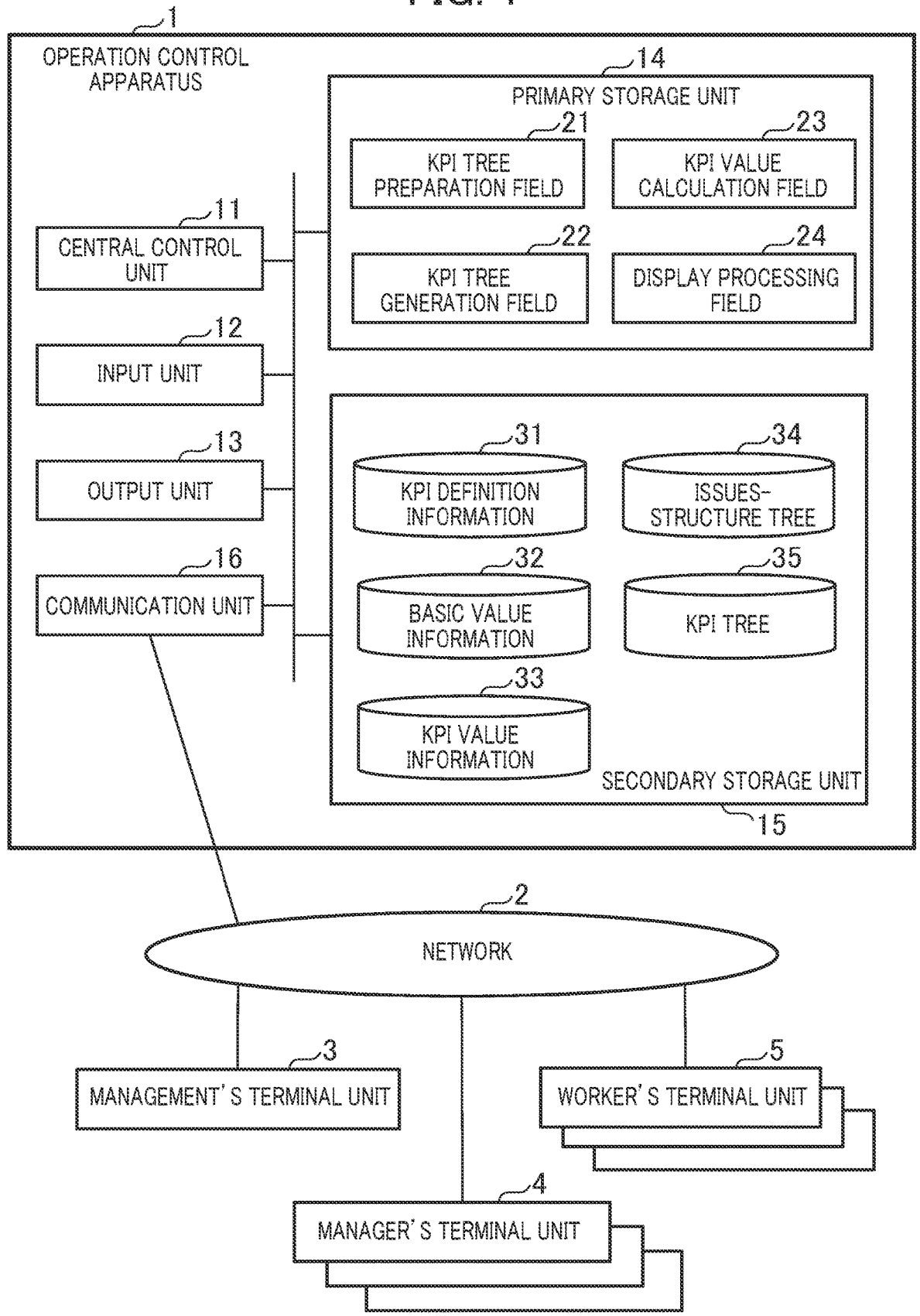
FIG. 1 is a view showing a structure of an operation control apparatus.

Hereinafter, an explanation will be made on an embodiment for carrying out the present invention referring to the drawings. An operation control apparatus of this embodiment executes the production control for the company as a manufacturer. However, the embodiment is a mere example. The present invention is applicable to an entire organization which includes a plurality of departments, and performs management control based on KPI. The organization described herein represents not only a single company but also a group constituted by companies combined for capital, sales activity and the like.

(Operation Control Apparatus)

FIG. 1 is a view showing a structure of an operation control apparatus. An operation control apparatus 1 as a computer includes a central control unit 11, an input unit 12 such as a mouse, a keyboard and the like, an output unit 13 such as a display and the like, a primary storage unit 14, an secondary storage unit 15, and a communication unit 16. Those components are mutually connected via a bus. The secondary storage unit 15 stores KPI definition information 31, basic value information 32, KPI value information 33, an issues-structure tree 34, and a KPI tree 35 (each will be described later in detail).

A KPI tree preparation field 21, a KPI tree generation field 22, a KPI value calculation field 23, and a display processing field 24 as programs are stored in the primary storage unit 14. The central control unit 11 loads the information read from the secondary storage unit 15 into the primary storage unit 14 so that each function of the programs is implemented (to be described later in detail). The secondary storage unit 15 may be structured separately from the operation control apparatus 1. The operation control apparatus 1 is communicable with a management's terminal unit 3, a manager's terminal unit 4, and a worker's terminal unit 5 via a network 2.

A large number of people that make up the company may be mainly classified into groups of managements, managers, and workers depending on the position and the role. The management, the manager and the worker are accessible to the common operation control apparatus 1 using the management's terminal unit 3, the manager's terminal unit 4, and the worker's terminal unit 5, respectively. A "user" to be described in the embodiment denotes either the management, the manager, or the worker. Each of the terminal units 3 to 5 is a computer which includes the central control unit, the input unit, the output unit, the primary storage unit, the secondary storage unit, and the communication unit. Furthermore, the operation control apparatus 1 may be configured to serve as the terminal units 3 to 5 either entirely or partially.

(KPI Definition Information)

FIG. 2 is a view showing an example of the KPI definition information 31. The KPI definition information 31 has KPI IDs stored in a KPI ID field 101 in association with the KPI stored in a KPI field 102, a measurement purpose stored in a measurement purpose field 103, a definition formula stored in a definition formula field 104, a responsible department stored in a responsible department field 105, and a threshold value stored in a threshold value field 106.

The KPI ID of the KPI ID field 101 denotes an identifier which uniquely specifies the KPI (to be described below).

The KPI of the KPI field 102 denotes a type of numerical value required for evaluating the task to be solved by the company. The numerical value to be set as the KPI value may differ in accordance with the company. In most cases, however, the KPI belongs to the key performance indicator (KPI). The unit of the KPI may be the ratio or the like calculated by processing the number of cases, time or other numerical values.

The measurement purpose of the measurement purpose field 103 denotes the purpose for the use (measurement) of the KPI by the company.

The definition formula of the definition formula field 104 denotes a formula for calculating the KPI. Terms of the right side of the definition formula, for example, "sales amount", "product inventory quantity", and the like are called "basic values" (to be described later in detail). The term "Σ" denotes the sum total for all facilities.

The responsible department of the responsible department field 105 denotes a name of the department responsible for the KPI. The responsible department is responsible for the KPI as a result of operation performed by the responsible department or an arbitrary field under its control, for example, in-house logistics, manufacturing, maintenance, procurement, and the like.

The threshold value of the threshold value field 106 is applied to the KPI. If the value of the KPI exceeds (or below) the threshold value, the operation control apparatus 1 determines that the KPI has abnormality. The term "#" represents a different value which is omitted (the same applies to FIGS. 3 and 4).

(Basic Value Information)

FIG. 3 is a view showing an example of the basic value information 32. The basic value information 32 stores the above-described basic values in a time series manner.

A time period of a time period field 111 denotes a time period as a unit for business management. For example, the time period "January, 2019" denotes the time period from Jan. 1, 2019 to Jan. 31, 2019. The user determines length of the time period arbitrarily in accordance with actual circumstances of the respective companies.

The codes "#" each indicating the specific values such as sales amount, the product inventory quantity, and production result are stored in the table sideways (fields 112 to 120). Those values are basic values contained in the right side of the definition formula of the KPI definition information 31. Because of limited space, FIG. 3 cannot show all the basic values. It is assumed that the basic value information 32 stores all the basic values in the fields to the right of the field 120 for calculating the KPI "the number of unexpected facility failures", "unexpected facility downtime", "Parts and material on time receiving rate", and "parts and material defective rate".

(KPI Value Information)

FIG. 4 is a view showing an example of the KPI value information 33. The KPI value information 33 stores specific values of KPI as described above (KPI values) in a time series manner.

The time periods of a time period field 131 are the same as those shown in FIG. 3.

The codes "#" indicating the specific values of the respective KPI are stored in the table sideways (field 132). Terms "C001", "C002", and the like denote KPI IDs.

(Issues-Structure Tree)

Figure 5:
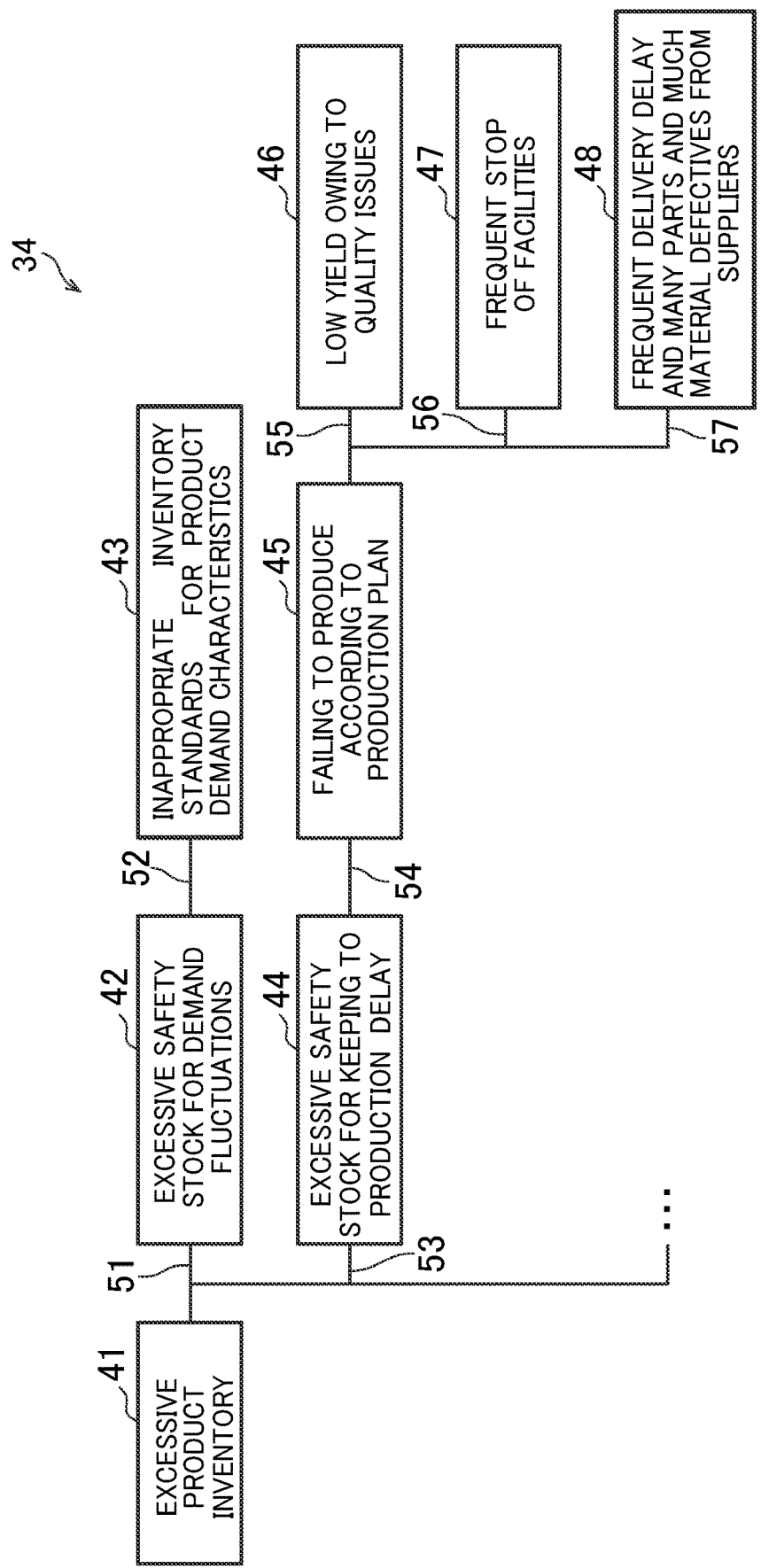
FIG. 5 is a view showing an example of an issues-structure tree.

FIG. 5 is a view showing an example of the issues-structure tree 34. The issues-structure tree 34 includes a plurality of nodes 41 to 48 each including a description of the issues, and links 51 to 57 each connecting two nodes. The issues denotes the task to be solved from the viewpoints of the management, manager, and worker in the organization including a plurality of departments.

Each of the links 51 to 57 represents the causal relation between two issues. The node at the right side of the link denotes the cause, and the node at the left side of the link denotes the result. Many nodes become causes of the other nodes, and at the same time, results of the other nodes. As an exceptional example, there may be a root node 41 with no result, and leaf nodes 43, 46 to 48 with no causes.

In most cases, the issues-structure tree 34 has a tree structure constituted by the root node at the left side (result side), and leaf nodes at the right side (cause side). Normally, there is "1" root node, and there are a plurality of leaf nodes. In the company, relatively, the node at the result side becomes the task for the management. Mostly, the node at the cause side becomes the task for the worker, and the intermediate node between the above-described nodes becomes the task for the manager. There may be the extremely exceptional case that the issues-structure tree 34 has an inverted tree shape having a plurality of results from the single cause. In the embodiment, the above-described exceptional case will be disregarded for the purpose of simplifying the explanation.

(Association of KPI With Issues)

Figure 6:
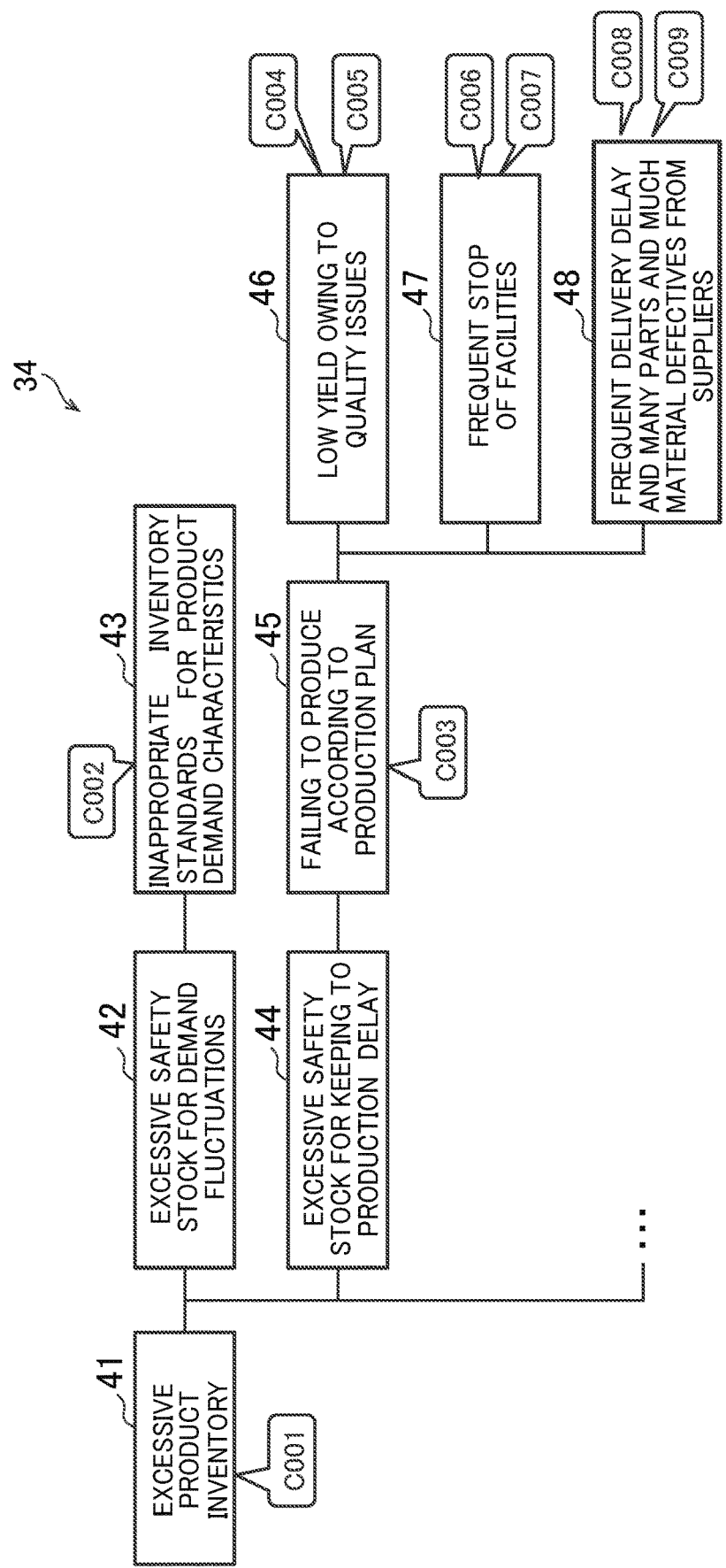
FIG. 6 is an explanatory view of association of the KPI with the issues.

FIG. 6 is an explanatory view showing association of the KPI with the issues. The above-described issue is merely expressed as qualitative character strings. In order to evaluate the issues quantitatively, the operation control apparatus 1 associates the KPI with the issues. The operation control apparatus 1 associates the KPI ID "C001" with the "excessive product inventory" (node 41), representing that evaluation of the issue of the "excessive product inventory" using the value of the product inventory turnover ratio is effective. Similarly, the operation control apparatus 1 associates the KPI IDs "C004" and "C005" with the "low yield owing to quality issues" (node 46), representing that evaluation of the issue of "low yield owing to quality issues" using values of the production defective rate and the number of defectives is effective.

Meanwhile, the operation control apparatus 1 does not associate the KPI ID with the "excessive safety stock for demand fluctuations" (node 42), representing that there is no KPI that allows effective evaluation of the issue of "excessive safety stock for demand fluctuations", or there is no need of direct evaluation of the issue. More specifically, the issue of "excessive safety stock for demand fluctuations" may be evaluated simultaneously with evaluation of the issue of "inappropriate inventory standards for product demand characteristics" (node 43) at the same time using effectively the value of a product stockout rate (C002).

(KPI Tree)

Figure 7:
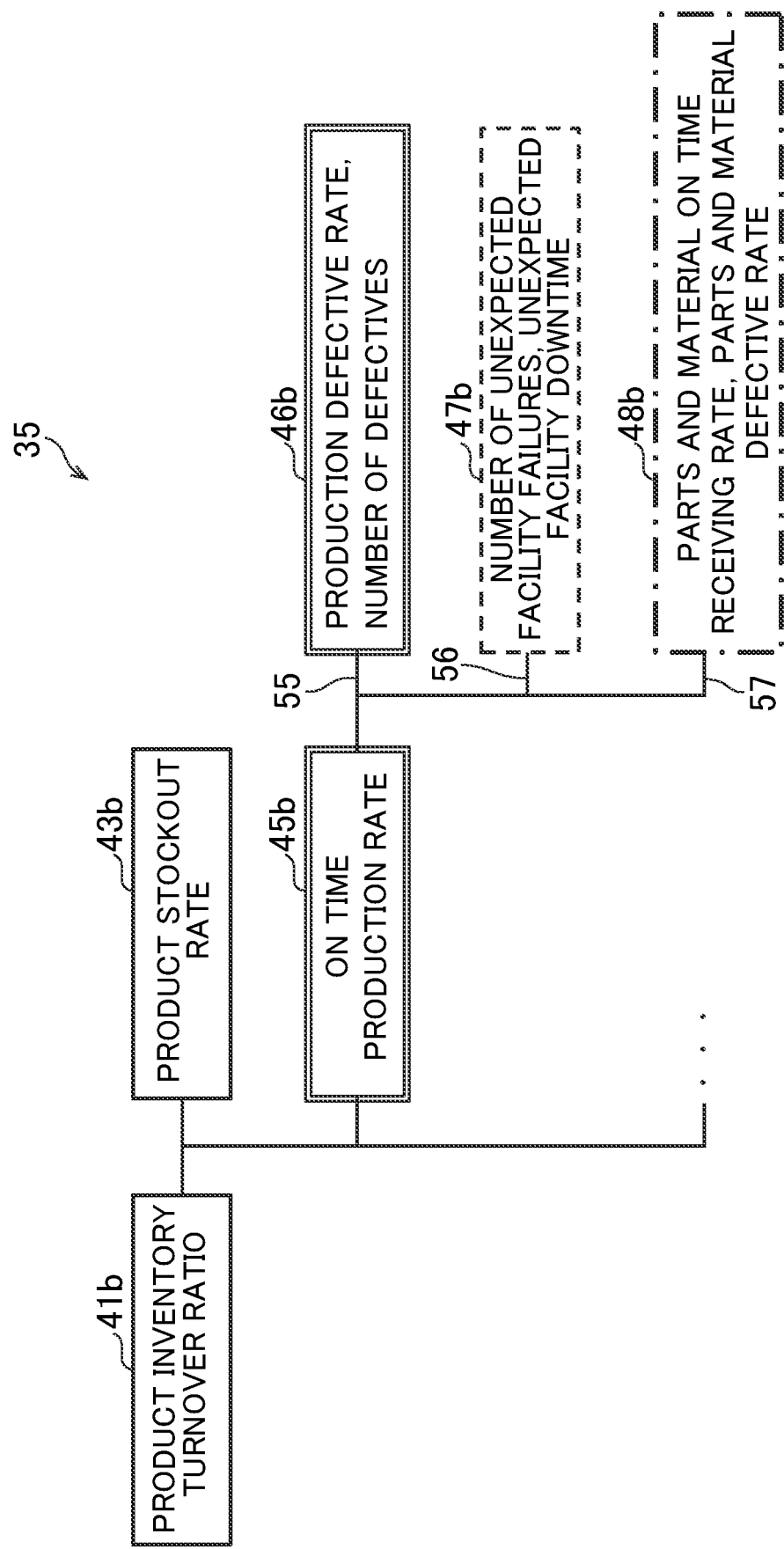
FIG. 7 is a view showing an example of a KPI tree.

FIG. 7 is a view showing an example of the KPI tree 35. The operation control apparatus 1 executes the following processing to generate the KPI tree 35 (FIG. 7) from the issues-structure tree 34 (FIG. 6).

The operation control apparatus 1 converts the issue of the node associated with the KPI ID among those of the issues-structure tree 34 into the KPI specified by the KPI ID.

The operation control apparatus 1 deletes the node with which the KPI ID is not associated among those of the issues-structure tree 34. The nodes at the left and right sides of the deleted node are connected via the direct link.

Referring to the KPI tree 35 as shown in FIG. 7, the issues of each node is converted into one or more KPI suitable for the quantitative evaluation, and the number of layers of the causal relation is reduced. The nodes 41*b*, 43*b*, 45*b*, 46*b*, 47*b*, 48*b* as shown in FIG. 7 correspond to the nodes 41, 43, 45, 46, 47, 48, respectively. Rectangular frames of six nodes as shown in FIG. 7 are drawn with four types of lines (solid line, double line, broken line, dashed line). Those lines correspond to the responsible departments as shown in FIG. 2. In the embodiment, measures taken by the responsible departments are expressed by different lines. However, it is possible to clearly visualize the correspondence to the responsible departments through the display in different colors.

(Processing Procedure)

Figure 8:
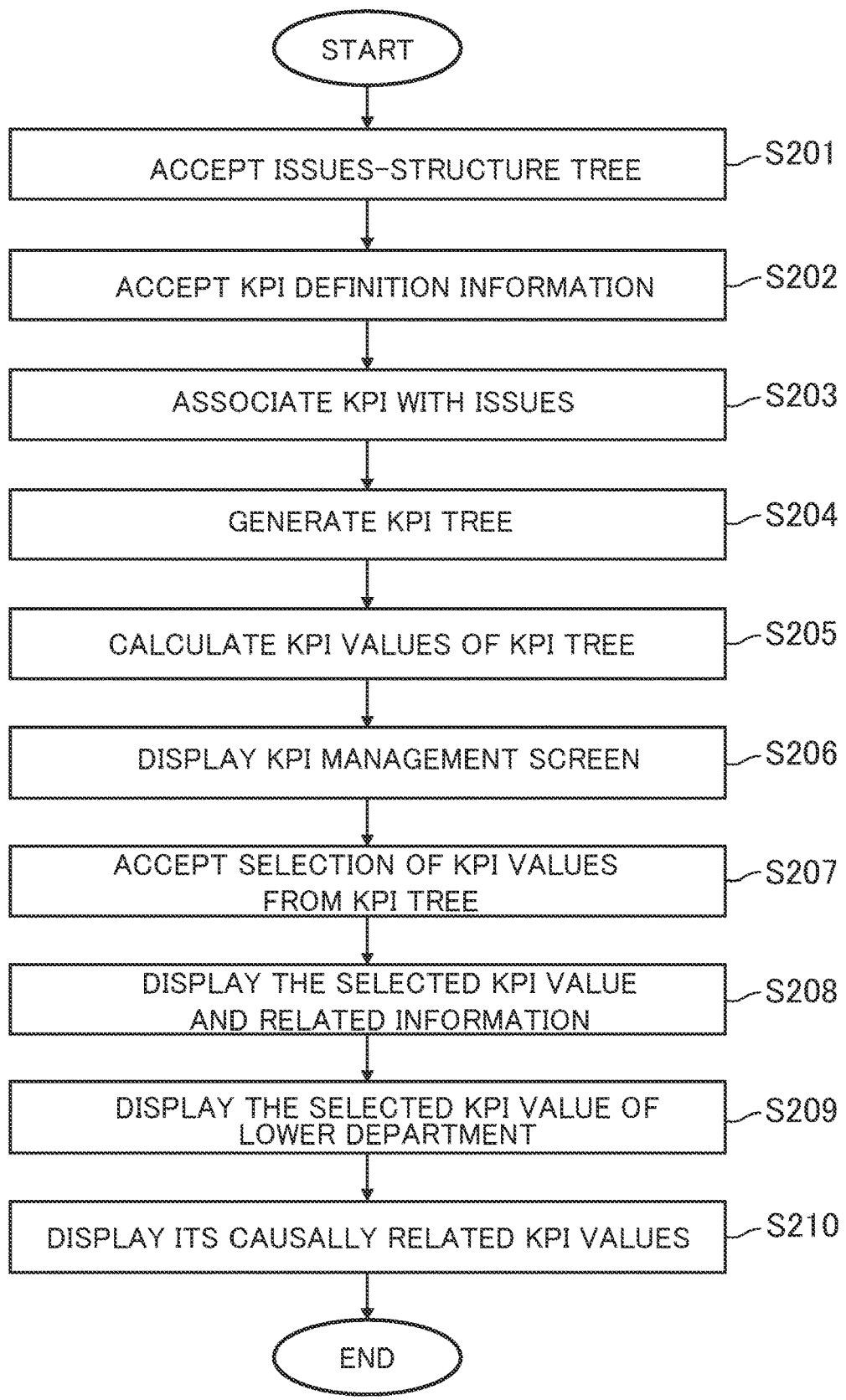
FIG. 8 is a flowchart of a processing procedure.
Figure 9:
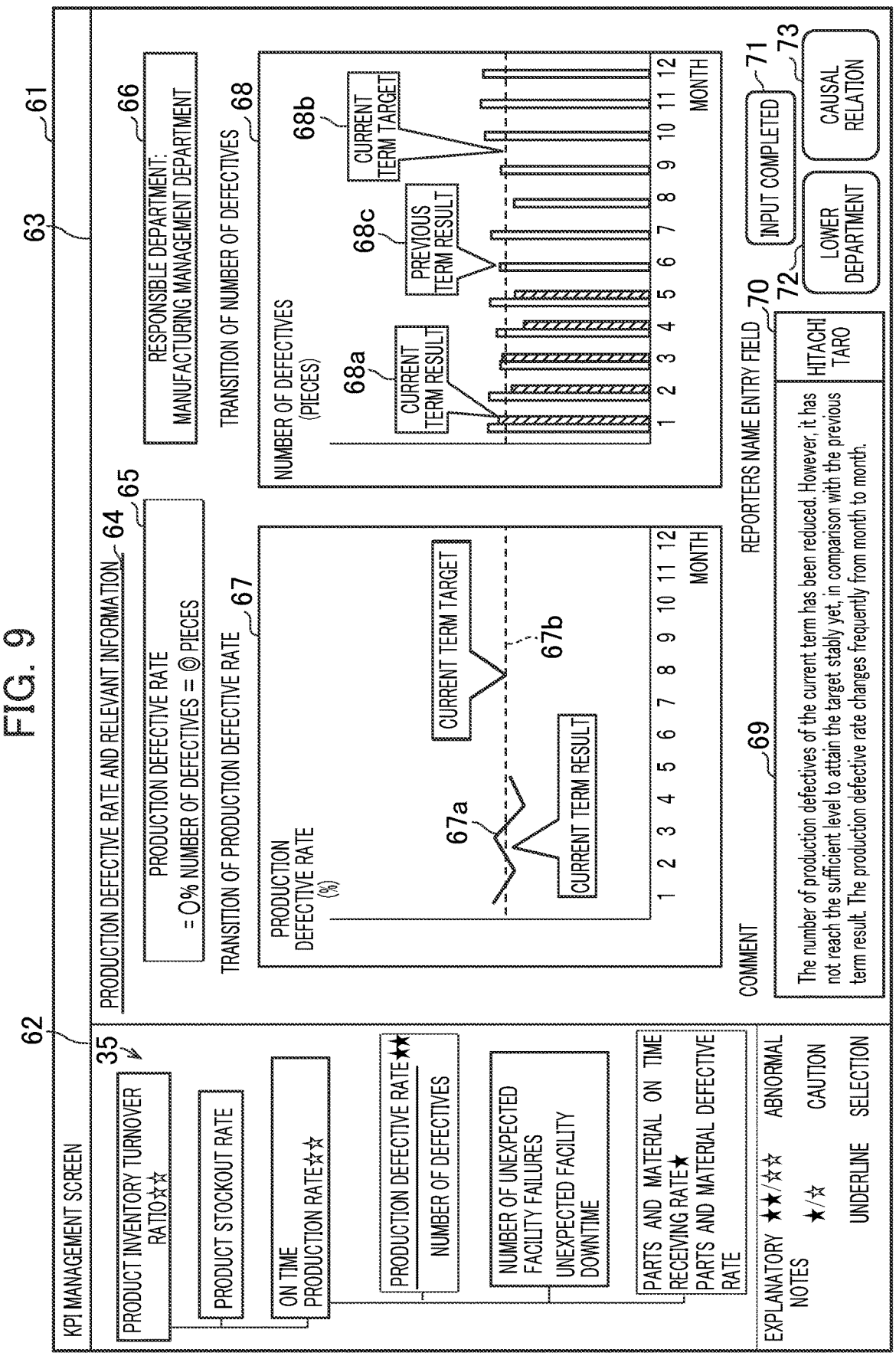
FIG. 9 is a view showing a display example of a KPI management screen.

FIG. 8 is a flowchart of the processing procedure. The processing procedure is started on the assumption that the basic value information 32 (FIG. 3) in the completed state is stored in the secondary storage unit 15. FIGS. 9 to 11 will be referred in the course of description of the processing procedure.

In step S201, the KPI tree preparation field 21 of the operation control apparatus 1 accepts the issues-structure tree 34 (FIG. 5). Specifically, in the first stage, the KPI tree preparation field 21 accepts a user's input of the issues-structure tree 34 via either the management's terminal unit 3, the manager's terminal unit 4 or the worker's terminal unit 5. The user in this case may be either the management, manager, or worker.

The KPI tree preparation field 21 allows the user to draw the node and the link on the touch panel of each terminal unit, and accepts an input of text strings of the issues through the keyboard. Multiple users with different positions may input the information to the respective terminal units simultaneously or sequentially so that the issues-structure tree 34 is completed.

In the second stage, the KPI tree preparation field 21 stores the issues-structure tree 34 accepted in the first stage of step S201 to the secondary storage unit 15.

In step S202, the KPI tree preparation field 21 accepts the KPI definition information 31 (FIG. 2). Specifically, in the first stage, the KPI tree preparation field 21 accepts the user's input of the KPI definition information 31 via the management's terminal unit 3, the manager's terminal unit 4, or the worker's terminal unit 5. The user in this case may be either the management, manager, or worker, and the same as or different from the user who has inputted the information in the first stage of step S201.

The KPI tree preparation field 21 accepts the user's input of table information of the KPI definition information 31 to each terminal unit. Multiple users with different positions may input the table information to the respective terminal units simultaneously or sequentially so that the KPI definition information 31 is completed.

In the second stage, the KPI tree preparation field 21 stores the KPI definition information 31 accepted in the first stage of step S202 to the secondary storage unit 15.

In step S203, the KPI tree generation field 22 of the operation control apparatus 1 associates the KPI with the issues. Specifically, in the first stage, the KPI tree generation field 22 displays the issues-structure tree 34 (FIG. 5), and the KPI definition information 31 (FIG. 2) on the user's output unit, either the management's terminal unit 3, manager's terminal unit 4, or worker's terminal unit 5. The user in this case may be either the management, manager, or worker, and the same as or different from the user who has inputted the information in the first stage of step S201 or step S202.

In the second stage, the KPI tree generation field 22 accepts the user's association of one or more KPI with an arbitrary issues on the screen. At this time, the user adds a KPI code of the KPI definition information 31 to the node of the issues-structure tree 34 in the form of a "balloon", for example (see FIG. 6). Multiple users with different positions may input the balloon to the respective terminal units simultaneously or sequentially.

In step S204, the KPI tree generation field 22 generates the KPI tree 35 (FIG. 7). Specifically, the KPI tree generation field 22 generates the KPI tree 35 from the issues-structure tree 34 (FIG. 6) associated with the KPI in the second stage of step S203. The specific method of generating the KPI tree 35 has been described referring to FIG. 7.

In step S205, the KPI value calculation field 23 of the operation control apparatus 1 calculates the KPI values of the KPI tree 35. Specifically, in the first stage, the KPI value calculation field 23 acquires the definition formula corresponding to the KPI ID associated with the node in the second stage of step S203 from the KPI definition information 31 (FIG. 2).

In the second stage, the KPI value calculation field 23 acquires the basic value contained in the right side of the definition formula acquired in the first stage of step S205 from the basic value information 32 (FIG. 3).

In the third stage, the KPI value calculation field 23 calculates the KPI values of the KPI specified by the KPI ID which has been associated with the node in the second stage of step S203 using the basic value acquired in the second stage of step S205.

The KPI value calculation field 23 executes the processing in step S205 at each time period for each KPI ID associated with the node in the second stage of step S203 so that the KPI value information 33 (FIG. 4) is completed, and the information is stored in the secondary storage unit 15. It is assumed that the KPI value calculation field 23 generates the KPI value information 33 at the time period limited to the one contained within the arbitrary evaluation period designated by the user. The evaluation period is set from January 2019 to May 2019 for convenience of explanation.

In step S206, the display processing field 24 of the operation control apparatus 1 displays a KPI management screen 61 (FIG. 9). Specifically, in the first stage, upon acceptance of a "screen display request" from any one of the management's terminal unit 3, the manager's terminal unit 4, and the worker's terminal unit 5 used by the arbitrary user, the display processing field 24 displays the KPI management screen 61 on the output unit of the terminal unit used by the user.

In the second stage, the display processing field 24 displays the KPI tree 35 in a KPI tree field 62 of the KPI management screen 61. The explanation on the processing procedure will be halfway suspended to make the explanation referring to FIG. 9.

FIG. 9 is a view showing a display example of the KPI management screen 61. The KPI tree 35 to be displayed in the KPI tree field 62 is essentially the same as the KPI tree 35 as shown in FIG. 7. There may be the case where such code as "★★" is added to the KPI.

The code "★★" indicates the determination of the display processing field 24 that the KPI has abnormality because of the KPI value in excess of or below the threshold value (field 106 of FIG. 2). The KPI value in this case denotes either the average value, maximum value, minimum value, or the latest value of the KPI values within the evaluation period (the same applies hereinafter).

The code "★" indicates the determination of the display processing field 24 that attention is needed for future change in the KPI value in excess of or below the threshold value although it is not currently in excess of or below the threshold value. The display processing field 24 determines that attention is needed if the distance between the KPI value and the threshold value becomes below the preliminarily designated caution distance (the same applies hereinafter).

The code "☆☆" indicates the determination of the display processing field 24 that the other KPI at the cause side has abnormality because of the other KPI values at the cause side in excess of or below the threshold value although the subject KPI value is not currently in excess of or below the threshold value.

The code "☆" indicates the determination of the display processing field 24 that attention is needed for future change in the other KPI values at the cause side to be in excess of or below the threshold value although the subject KPI value is not currently in excess of or below the threshold value.

In the explanation as described above, the abnormality of the KPI is expressed in two levels (abnormality or caution). Setting multiple threshold values may provide an arbitrary number of abnormality levels and display forms. Besides the codes "★" and "☆", it is possible to display the abnormality level in different colors, for example. The explanation will be made referring to FIG. 8.

In step S207, the display processing field 24 accepts selection of the KPI values from the KPI tree 35. Specifically, the display processing field 24 accepts the user's selection of any one of the KPI contained in the KPI tree 35 displayed on the KPI management screen 61 using the mouse or the like. It is assumed that the user selects the "production defective rate" to which the "★★" is added. The underline applied to the KPI shows that the KPI has been selected.

In step S208, the display processing field 24 displays the selected KPI value and related information. Specifically, when the user selects the KPI, the display processing field 24 displays the following information in a field 63 of the KPI management screen 61. The explanation will be made referring to FIG. 9 again.

Title 64

The information "○○ and relevant information" is displayed as a title 64. The "○○" denotes the selected KPI. The "relevant information" denotes the other KPI contained in the same node as the one which includes the selected KPI. If the selected KPI is the production defective rate, the relevant information becomes the number of defectives.

Representative KPI Value 65

A representative KPI value 65 denotes average values, maximum values, minimum values, or the latest values of the selected KPI and the relevant information within the evaluation period.

Responsible Department 66

A responsible department 66 denotes the department responsible for the selected KPI.

Time-Series Transition 67 of the Selected KPI

A time-series transition 67 includes a "current term result" 67a as the graph of the result value of the selected KPI within the evaluation period, and a "current term target" as the graph of the target value of the KPI designated by the user.

Time-Series Transition 68 of Relevant Information

A time-series transition 68 includes a "current term result" 68a as the graph of the result value of the relevant information within the evaluation period, a "current term target" 68b as the graph of the target value of the KPI designated by the user, and a "previous term result" 68c as the graph of the previous result value of the KPI.

Comment Field 69

The user inputs the comment on the selected KPI and/or relevant information into a comment field 69. The display processing field 24 stores the comment associated with the KPI ID for specifying the selected KPI and/or relevant information in the secondary storage unit 15. When the other user selects the subject KPI in another opportunity, the stored comment is displayed (the same applies to the name as described below).

Reporter's Name Entry Field 70

The user who has inputted the comment inputs his/her name into a reporter's name entry field 70.

Input Completed Button 71

After inputting the comment and name, the user presses an input completed button 71.

Lower Department Button 72

When the user presses a lower department button 72, the display processing field 24 performs transition of the KPI management screen 61 as shown in FIG. 9 to a KPI management screen 61*b* as shown in FIG. 10 (to be described later in detail).

Causal Relation Button 73

When the user presses a causal relation button 73, the display processing field 24 performs transition of the KPI management screen 61 as shown in FIG. 9 to a KPI management screen 61*c* as shown in FIG. 11 (to be described later in detail).

Either a line graph or a bar graph may be used by the display processing field 24 for displaying the result of the selected KPI or the like. It is possible for the display processing field 24 to or not to display the previous term result as the result of the selected KPI.

In most cases, the company has a plurality of work-site departments serving to perform the on-site operations of the same type, and the responsible department for integrating those work-site departments. The work-site department is the organization under the control of the responsible department. In that sense, the work-site department may be referred to as the lower department of the responsible department. An explanation will be made referring to FIG. 8 again on the assumption that the user presses the lower department button 72.

In step S209, the display processing field 24 displays the selected KPI value of the lower department. Specifically, when the user presses the lower department button 72, the display processing field 24 performs transition of the KPI management screen 61 to the KPI management screen 61*b*. The explanation will be made referring to FIG. 10.

FIG. 10 is a view showing a display example of the KPI management screen 61*b*. The display processing field 24 displays the following information in the field 63*b*.

Title 64*b*

The information "∞ and relevant information (lower department" is displayed as a title 64*b*.

Lower Department Fields 71 to 74

The lower department field 71 displays the information of a representative KPI value 71*a*, a time-series transition 71*b* of the selected KPI, and a time-series transition 71*c* of the relevant information, which relate to a "first plant" as one of the lower departments of a "manufacturing management department" as the responsible department. Likewise, lower department fields 72 to 74 display each information of the representative KPI value, the time-series transition of the selected KPI, and the time-series transition of the relevant information of the "second plant" to the "fourth plant" as other lower departments, respectively. An explanation of the displayed representative KPI values or the like for each of the lower departments is similar to the explanation relating to the representative KPI value or the like referring to FIG. 9. As the time-series graph is also similar to the one as shown in FIG. 9, FIG. 10 omits such graph. The basic value information 32 (FIG. 3) exists for each of the lower departments. The KPI value calculation field 23 calculates the KPI values for each of the lower departments.

Return Button 75

When the user presses a return button 75, the display processing field 24 performs transition of the KPI management screen 61*b* as shown in FIG. 10 to the KPI management screen 61 as shown in FIG. 9.

An explanation will be made referring to FIG. 8 on the assumption that the user presses the return button 75 to return to the KPI management screen 61 as shown in FIG. 9, and then presses the causal relation button 73.

In step S210, the display processing field 24 displays its causally related KPI values. Specifically, when the user presses the causal relation button 73, the display processing field 24 performs transition of the KPI management screen 61 to the KPI management screen 61*c*. An explanation will be made referring to FIG. 11.

FIG. 11 is a view showing a display example of the KPI management screen 61*c*. A KPI tree 35*b* displayed in a field 62*c* is essentially the same as the KPI tree 35 as shown in FIG. 9. In this case, however, a node 46*b* containing the selected KPI and other nodes 41*b* and 45*b* in direct causal relation with the node 46*b* are highlighted. The "direct causal relation" in this case denotes a direct causal relation linearly connected from an upstream side to a downstream side instead of the parallel branched collateral relation.

The display processing field 24 displays the following information in a field 63*c*.

Title 64*c*

The information "∞ and relevant information (causal relation)" is displayed as a title 64*c*.

Upper KPI Field 81

A representative KPI value 81*a*, a time-series transition 81*b* of the selected KPI, and a time-series transition 81*c* of the relevant information, which relate to the highlighted causally related node at the most upstream side are displayed in an upper KPI field 81 at the rightmost side of the field 63*c*.

Lower KPI Field 82

A representative KPI value 82*a*, and a time-series transition 82*b* of the selected KPI, which relate to the highlighted causally related node at the most downstream side are displayed in a lower KPI field 82 at the leftmost side of the field 63*c*. In the presence of the relevant information, the time-series transition of the relevant information will be displayed as well.

Intermediate KPI Field 83

A representative KPI value 83*a*, and a time-series transition 83*b* of the selected KPI, which relate to one or more nodes except the highlighted causally related nodes at both sides are displayed between the upper KPI field 81 and the lower KPI field 82 of the field 63*c*. In the presence of the relevant information, a time-series transition of the relevant information will be displayed as well.

It is assumed that the user selects the "product inventory turnover ratio" displayed in the lower KPI field 82 using the mouse or the like (code: 84*a*). The display processing field 24 acquires the responsible department "in-house logistics management department" corresponding to the "product inventory turnover ratio" in reference to the KPI definition information 31 (FIG. 2). The display processing field 24 displays the "in-house logistics management department" associated with the "product inventory turnover ratio" of the lower KPI field 82 (code: 85*a*).

It is assumed that the user selects the "on time production rate" displayed in an intermediate KPI field 83 using the mouse or the like as another example (code: 84*b*). The display processing field 24 displays the "manufacturing management department" associated with the "on time production rate" (code: 85*b*). It is known that the department responsible for the production defective rate and the number of defectives is the manufacturing management department (code: 66).

Checking the above-described KPI management screen 61*c*, the user of the manufacturing management department may consider in the following manner.

The production defective rate has to be lowered under responsibility of the user's department (manufacturing management department).

If the production defective rate cannot be sufficiently lowered, the on time production rate will be reduced. The user's department is responsible for reduction in the on time production rate, and will not bring any other department into trouble. However, if the product inventory turnover ratio is lowered by further reduction in the on time production rate, the user's department will bring the responsible in-house logistics management department into trouble. Therefore, it is preferable to timely notify the in-house logistics management department of the cause of failing to lower the production defective rate.

Checking the same KPI management screen 61*c*, the user of the in-house logistics management department may consider in the following manner.

Further increase in the production defective rate will reduce the on time production rate. The lowered product inventory turnover ratio may put the responsibility on the user's department (in-house logistics management department).

It is therefore necessary to timely ask the manufacturing management department to lower the production defective rate, or propose for collaboration.

After execution of step S210, the processing procedure ends.

(Advantageous Effects of the Embodiment)

The operation control apparatus according to the embodiment provides the following advantageous effects.

(1) The operation control apparatus is capable of generating the KPI tree indicating the causal relation of the KPI for defining the responsible department from the issues-structure tree indicating the subject causal relation of the issues.

(2) The operation control apparatus is capable of displaying the KPI tree.

(3) The operation control apparatus is capable of displaying the abnormality level of the KPI.

(4) The operation control apparatus is capable of displaying the KPI especially required by the user for evaluation in a time series manner.

(5) The operation control apparatus is capable of displaying the department responsible for the KPI, and the lower department to be managed and instructed by the responsible department on the same screen.

(6) The operation control apparatus is capable of displaying directly causally related KPI on the same screen.

The present invention is not limited to the example as described above, but includes various modifications. For example, the example is described in detail for readily understanding of the present invention which is not necessarily limited to the one equipped with all structures as described above. It is possible to replace a part of the structure of one example with the structure of another example. The one example may be provided with an additional structure of another example. It is further possible to add, remove, and replace the other structure to, from and with a part of the structure of the respective examples.

What is claimed is:

1. An operation control apparatus comprising:
   a key performance indicator (KPI) tree preparation field for accepting user inputs from a plurality of users simultaneously or serially and generating an issues-structure tree indicating a causal relation of an issue of an organization having a plurality of departments, and KPI definition information having a KPI for evaluating the issue mutually associated with the department responsible for the KPI, the KPI being related to production rates at a manufacturing plant;
   a KPI tree generation field for generating a KPI tree indicating the causal relation of the KPI from the issues-structure tree indicating the causal relation of the issue, wherein the KPI tree generation field is configured to display the issues-structure tree and the KPI definition information on an output unit in a first stage, accept the users' association of one or more KPI with an arbitrary issue on the output unit in a second stage, and generate the KPI tree from the issues-structure tree associated with the KPI in the second stage, wherein; and
   a display processing field configured to allow the output unit to display the generated KPI tree,
   wherein the display processing field is configured to:
   display the KPI constituting the KPI tree in a form which differs in accordance with a level of abnormality of the KPI,
   accept the user's selection of any one of the KPI constituting the KPI tree, and display a value of the selected KPI in a time-series manner,
   when a lower department button that is displayed is selected, transition to display the department responsible for the selected KPI, and display a value of the selected KPI in a time-series manner for each lower department under control of the responsible department simultaneously on a same screen on which the responsible department is displayed.

2. The operation control apparatus according to claim 1, wherein the display processing field is configured to display the directly causally related KPI among those constituting the KPI tree on the same screen.

3. An operation control method for an operation control apparatus, wherein:
   a key performance indicator (KPI) tree preparation field of the operation control apparatus accepts user inputs from a plurality of users simultaneously or serially and generates an issues-structure tree indicating a causal relation of an issue of an organization having a plurality of departments, and KPI definition information having a KPI for evaluating the issue mutually associated with the department responsible for the KPI, the KPI being related to production rates at a manufacturing plant;
   a KPI tree generation field of the operation control apparatus generates a KPI tree indicating the causal relation of the KPI from the issues-structure tree indicating the causal relation of the issue, wherein the KPI tree generation field is configured to display the issues-structure tree and the KPI definition information on an output unit in a first stage, accept the users' association of one or more KPI with an arbitrary issue on the output unit in a second stage, and generate the KPI tree from the issues-structure tree associated with the KPI in the second stage; and
   a display processing field which allows the output unit to display the generated KPI tree, wherein the display processing field displays the KPI constituting the KPI tree in a form which differs in accordance with a level of abnormality of the KPI, wherein the display processing field accepts the user's selection of any one of the KPI constituting the KPI tree, and displays a value of the selected KPI in a time-series manner, and wherein when a lower department button that is displayed is selected, the display processing field transitions and displays the department responsible for the selected KPI, and displays a value of the selected KPI in a time-series manner for each lower department under control of the responsible department simultaneously on a same screen on which the responsible department is displayed.

4. An operation control program for enabling an operation control apparatus to cause:

a key performance indicator (KPI) tree preparation field of the operation control apparatus to execute processing of accepting user inputs from a plurality of users simultaneously or serially and generating an issues-structure tree indicating a causal relation of an issue of an organization having a plurality of department, and KPI definition information having a KPI for evaluating the issue mutually associated with the department responsible for the KPI, the KPI being related to production rates at a manufacturing plant;

a KPI tree generation field of the operation control apparatus to execute processing of generating a KPI tree indicating the causal relation of the KPI from the issues-structure tree indicating the causal relation of the issue, wherein the KPI tree generation field is configured to display the issues-structure tree and the KPI definition information on an output unit in a first stage, accept the users' association of one or more KPI with an arbitrary issue on the output unit in a second stage, and generate the KPI tree from the issues-structure tree associated with the KPI in the second stage; and a display processing field which allows the output unit to display the generated KPI tree, wherein the display processing field displays the KPI constituting the KPI tree in a form which differs in accordance with a level of abnormality of the KPI, wherein the display processing field accepts the user's selection of any one of the KPI constituting the KPI tree, and displays a value of the selected KPI in a time-series manner, and wherein when a lower department button that is displayed is selected, the display processing field transitions and displays the department responsible for the selected KPI, and displays a value of the selected KPI in a time-series manner for each lower department under control of the responsible department simultaneously on a same screen on which the responsible department is displayed.

* * * * *